Jan. 22, 1957 P. G. SULZER 2,778,940

MULTI-PHASE OSCILLATOR

Filed July 14, 1954

INVENTOR
PETER G. SULZER

BY Hyman Hurvitz

ATTORNEY

United States Patent Office 2,778,940

Patented Jan. 22, 1957

2,778,940

MULTI-PHASE OSCILLATOR

Peter G. Sulzer, Kensington, Md., assignor to Frank H. McIntosh, Chevy Chase, Md.

Application July 14, 1954, Serial No. 443,201

12 Claims. (Cl. 250—36)

Figures 1, 2:
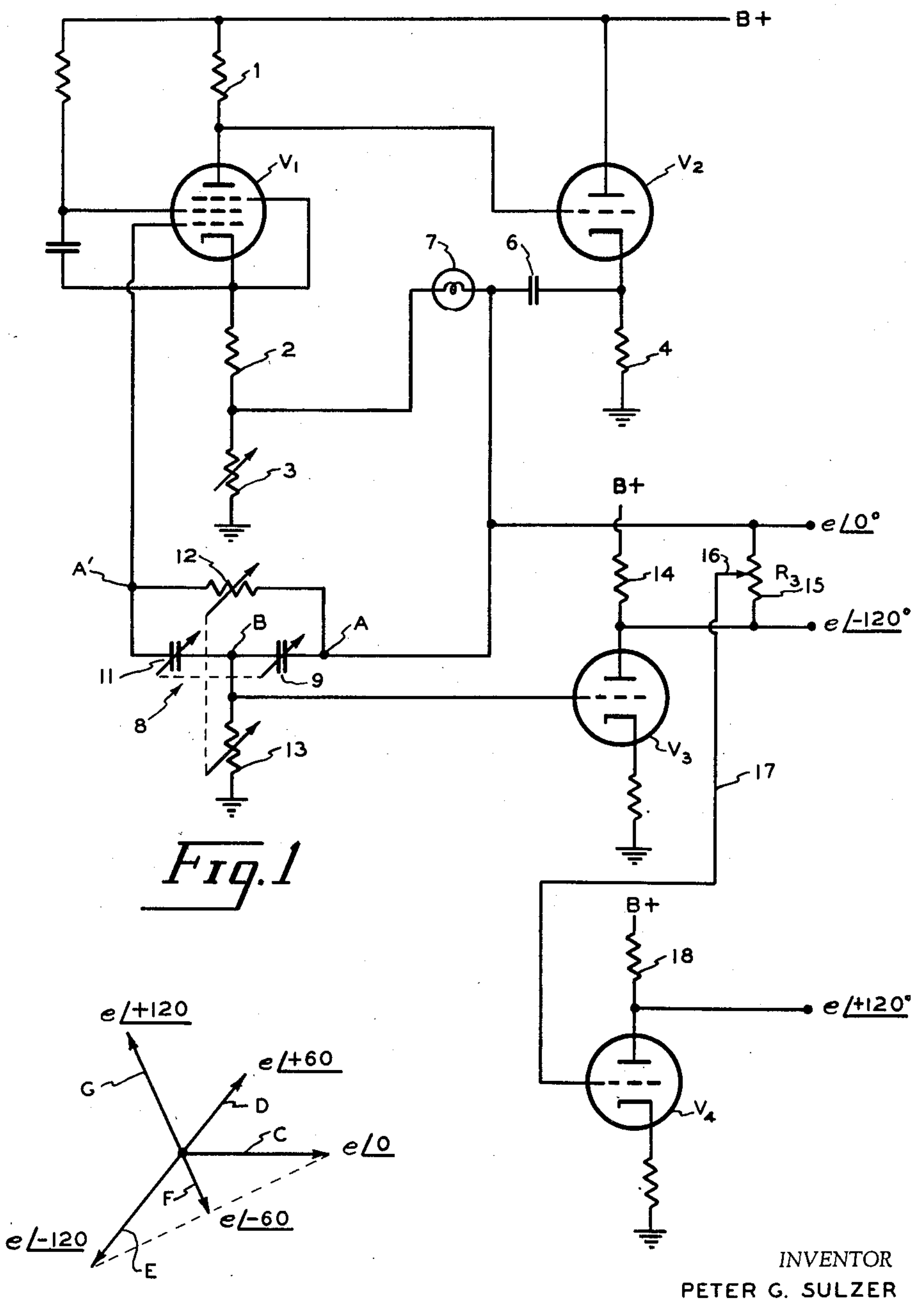

The present invention relates generally to oscillators, and more particularly to wide band variable frequency oscillators which are capable of providing a plurality of voltages having fixed relative phase angles, as the frequency of the oscillator is varied.

There exists a need for three-phase sources of voltages, of variable frequency, particularly for use in energizing three-phase variable speed motors, but also for other purposes. There are numerous methods available in the prior art for providing such voltages. One such method is to drive a three-phase generator at varying speeds. The disadvantages of this method are, (1) that it is difficult to obtain a wide frequency range because of limitations on speed control of the generator and its driving motor, and (2) that it is difficult to obtain a constant output voltage as generator speed varies. Other systems utilized in the prior art employ phase shifting networks in conjunction with conventional variable-frequency single-phase audio oscillators. The principle disadvantage of these systems is generally that the phase shift networks must be readjusted when operating frequency is changed, since they are frequency sensitive.

The present invention resides in the provision of an oscillator which is effectively tuned by a bridged-T network, from which is obtained voltages which remain fixed in relative phase as the frequency of the oscillator is varied by varying the parameters of the bridged-T network. Oscillators of the type referred to have been widely used in the past because of their simplicity, compactness, excellent frequency stability, and relatively wide tuning range. The particular oscillator utilized in the present invention is of the regenerative-degenerative feed-back type, and such oscillators are described in considerable detail in an article, written by the present inventor, and which appeared in the September, 1950, issue of Electronics, a publication of the McGraw-Hill Publishing Company, Incorporated.

Briefly describing the invention, a first feed-back path in an RC oscillator provides regenerative feed-back and includes a tungsten lamp amplitude stabilizer. A degenerative frequency feed-back loop is also provided, which contains a bridged-T frequency determining network, the electrical constants of which primarily establish the operating frequency of the oscillator. The oscillator includes two vacuum tubes connected in cascade, the first being plate loaded and the second operated as a cathode follower. The low impedance output at the cathode load of the cathode follower tube supplies the two feed-back loops above referred to, the output of the regenerative loop being connected across a cathode resistor in the cathode of the first tube, and the output of the degenerative loop being connected to the control grid of this first tube. Voltages at fixed phase angles may then be taken at selected points of the bridged-T frequency determining network of the degenerative feed-back loop. The phase angles may be predetermined by appropriately selecting the relative values of the components in the frequency determining network, and the phase angles remain fixed while oscillator frequency varies over a very wide range. Taking two voltages of fixed relative phase, from selected points of the bridged-T network, a third voltage, having a fixed phase angle with respect to the first two voltages, may be derived by mixing the first two voltages in an additive mixing circuit, and deriving a voltage from the mixing circuit which bears a desired phase angle with respect to the first two voltages.

It has been found that devices constructed in accordance with the present invention may provide the commonly desired fixed phase angles of zero, $-120°$ and $+120°$, over a wide range of frequencies, and at fixed amplitudes. By varying the relative values of the various components in the bridged-T network, various other phase angle relationships may be established. Further, by adjusting the additive mixing circuit, the phase angle of the third voltage may be varied over a considerable range intermediate the two voltages taken directly from the bridged-T network. It has been found that not only are the phase angles of output voltages, as above derived, independent of oscillator frequency, but also that the output voltage magnitudes are independent of the frequency of oscillation.

It is, accordingly, a broad object of the present invention to provide a variable frequency oscillator for producing a plurality of voltages having fixed phase angles.

Another object of the present invention is to provide an RC oscillator, of the regenerative-degenerative feed-back type, for producing a plurality of voltages at fixed relative phase angles.

Another object of the present invention is to provide an oscillator for producing voltages at fixed phase angles in which the various voltages are taken across elements of the oscillator frequency determining network and in which isolation circuits are employed to minimize the effects of load on the voltage across these elements.

A still further object of the present invention is to provide an oscillator having a bridged-T frequency determining network in which the various elements of the bridged-T bear a predetermined fixed relationship to one another, whereby to provide predetermined phase shifts across the elements.

Yet another object of the present invention is to provide an RC oscillator, having both regenerative and degenerative feed-back loops, in which the frequency determining element of the system is a bridged-T network, and in which the various elements of the bridged-T network bear a predetermined fixed relationship with respect to each other, these relationships being selected to provide for known phase shifts across the various elements.

It is a further object of the present invention to provide a variable-frequency amplitude-stabilized RC multiphase oscillator of the degenerative-regenerative feedback type in which the frequency may be varied over a wide range without affecting the amplitude of the multiphase output voltages, or a predetermined phase relationship of the output voltages.

It is yet another object of the present invention to provide an oscillator for producing a plurality of voltages bearing a fixed phase relationship with respect to each other, in which the phase relationships may be varied without varying the frequency of the oscillator.

A further object of the present invention is to provide a variable frequency, amplitude stabilized oscillator for generating a plurality of voltages bearing fixed phase relationships with respect to each other, and in which the voltages bearing other phase relationships may be derived by additively mixing the first mentioned voltages.

Yet another object of the present invention is to provide an oscillator for producing multi-phase output voltages in which the phase angle between the voltages may be varied without affecting the frequency of the oscillator, and in which the frequency of the oscillator may be varied without affecting the phase relationships and amplitudes of the output voltages.

Still further features, objects, and advantages of the present invention will become apparent upon consideration of the following detailed description of specific embodiments thereof especially when taken in conjunction with the accompanying drawings, wherein:

Figure 1 is a schematic circuit diagram of an RC oscillator of the regenerative-degenerative feed-back type, which is capable of producing a plurality of output voltages at fixed relative phase angles; and Figure 2 is a vector diagram showing the phase relationships between the voltages at various points in the circuit of Figure 1.

Referring now more specifically to Figure 1 of the accompanying drawings, there is provided a conventional pentode type amplifier tube V1, having a plate load 1, and two series connected resistors 2, 3, in series with the cathode of the tube, the resistor 3 being variable, and connected at one terminal to ground. The plate of the tube V1 is directly connected to the grid of a cathode follower tube V2, having a cathode load resistance 4. As a result of the direct connection of the anode of the tube V1 to tube V2 and the employment of resistive elements only in the plate-cathode circuits of the tubes, the plate currents flowing through these tubes are substantially 180° out of phase. The output of the tube V2 appears across the cathode load resistance 4. The signal developed across this resistance is coupled to the junction of the resistors 2 and 3 in the cathode circuit of the tube V1 through an A. C. coupling comprising a capacitor 6 and a tungsten filament lamp 7, in series. This path constitutes a regenerative feed-back connection between the tube V2 and the tube V1. A negative feed-back loop extends from the cathode of the tube V2, through the coupling capacitor 6, and via a bridged-T network 8 to the control grid of the tube V1.

If positive feed-back via the lamp 7, at a particular frequency, exceeds negative feed-back through the bridged-T network 8, oscillations will commence and will exist at the zero phase shift frequency of the network 8. As the amplitude of the oscillations increases the resistance of the lamp increases because of its positive temperature coefficient of resistance, thereby reducing the voltage available across resistance 3, until an equilibrium condition is reached such that an increase of oscillator output tends to cause a reduction of net positive feed-back. Variation of the value of variable resistance 3 may be employed to vary the output magnitude of the oscillator, by varying the value of regenerative voltage applied to the pentode V1.

The frequency determining network 8 consists of a bridged-T network having a capacitor 9 connected in one side of a cross arm of the network, a second capacitor 11 connected in the other side of that cross arm, and a resistor 12 which bridges these two capacitors. The leg of the T contains a resistor 13 which is connected between ground and the junction of the two capacitors 9 and 11. The input terminal A of the network 8 is at the junction of capacitor 9 and resistor 12 and the output terminal A' of the network 8 is at the junction of capacitor 11 and resistor 12. A first voltage output from the oscillator is taken from the point A, which also constitutes the input of the bridged-T network 8, and the phase of this voltage is taken as zero degrees (0°). This voltage is shown as the vector C in Figure 2 which is a vector diagram of the voltages in the circuit of Figure 1. A second voltage output may be taken from the junction B of the two capacitors 9 and 11 and the resistor 13. The phase angle of the voltage taken from the point B is fixed, as oscillator frequency varies, with respect to the angle of the voltage taken from the point A, this phase angle depending upon the relative values of the capacitors 9 and 11 and the resistors 12 and 13. For example, if it is desired to obtain a voltage which has a leading phase angle of 60 degrees with respect to the voltage at the point A, this condition being shown by the vector D of Figure 2, the ratio of the values of resistors 12 and 13 must be equal to twelve (12). This phase relationship will remain constant as the frequency of the oscillator varies, providing that the ratio of the values of resistors 12 and 13 remains constant, that capacitors 9 and 11 remain equal, and providing that the stray capacitance across resistor 13 is small.

To obtain a voltage which has a phase angle of −120°, with respect to the output at terminal A, as when balanced three-phase operation is desired, the output from the point B is directly connected to the grid of a vacuum tube V3, having an anode load resistance 14. The output voltage at the anode of the tube V3 is reversed 180° with respect to the input voltage, and since the input voltage leads the voltage at point A by 60°, the output voltage at the anode of the tube V3 lags the output at point A by 120°. The output voltage from the tube V3 is shown as the vector E in Figure 2.

Besides providing for phase reversal of the voltage at the point B, the tube V3 serves to isolate the point B from the load. If the output from point B were connected directly to a load, the load would parallel the resistor 13 and consequently change the value of the impedance in the leg at the T with respect to the value of the resistor 12. This would result in a change in the ratio of the values of these impedances and consequently change the phase angle. The output from the point A may be directly connected to a load since this output is taken across cathode resistor 4 of isolating tube V2, and the load will not affect the impedance values in the bridged-T network 8.

In order to obtain the third phase of a three-phase output, the voltage at point A and the output at the anode of the tube V3 are mixed, in an additive mixer described as follows: A resistor 15 is connected directly between the point A and the anode of the tube V3. The two voltages are additively mixed in this resistor, and a variable tap 16 taken therefrom. Depending upon the location of tap 16, a voltage of any phase between zero and −120° may be obtained. The output at tap 16 is connected directly over lead 17 to the input of a further vacuum tube V4, which may be plate loaded as by resistor 18 and the third output voltage may be taken from the anode of the tube V4. If balanced three-phase operation is desired, the output of the tube V4 should lead the voltage at the point A by 120°. Therefore, the input of the tube V4 will lag the voltage at the point A by 60°, this being shown by the vector F in Figure 2. Phase reversal in the tube, due to its anode loading, provides the desired voltage, which has a phase angle of +120° as shown by the vector G in Figure 2. The tube V4 also serves to isolate the output taken at tap 16 from the load, this isolation being necessary to prevent the lead from shunting the resistor 15.

It is apparent from the above explanation that voltages at other phase angles than 120° may be available, in the system of the present invention. By changing the ratio of the resistor 12 to the resistor 13, it is possible to vary the phase angle of the voltage at the point B of the frequency determining network 8 over a wide range of values, i. e. between approximately 20° to 80°. Also, by changing the setting of the tap 16 on resistor 15, it is possible to vary the phase angle of the voltage driving the tube V4 between values of 0° to 120°. Of course, if the angle between the output voltages at points A and B is varied, the range of the angle of the voltage to tube V4 will be varied concurrently.

The oscillator circuit shown in Figure 1 may be designed to cover a frequency band from 20 C. P. S. to 2 mc., in five sub-bands. A frequency ratio of 10 to 1 may be covered in each sub-band, the sub-bands being selected by introducing suitable values of resistances 12 and 13. To provide for changing the sub-bands the resistors 12 and 13 are made variable as shown in Figure 1. However, the sub-bands may be changed by switching in various values of the resistors 12 and 13. However, in order for the phase relationship between the voltages at points A and B to remain constant, between sub-bands, the ratio of the impedances of these two resistors must remain constant. To insure that the ratio of the values of resistors 12 and 13 remain constant the resistors are ganged and if switching is used the switches will be ganged. Oscillator frequency within each sub-band is selected by varying the values of capacitors 9 and 11. These capacitors may be ganged so that they are varied equally and when varied equally the frequency of the oscillator is varied, without a concurrent variation of relative phases of output voltage.

The embodiment of the invention shown in the schematic circuit diagram of Figure 1 employs a bridged-T network 8 which has capacitors connected in the cross arms of the T and resistors connected in the leg of the T and as the bridging impedance. Other four-impedance bridged-T networks may be utilized as the frequency determining element of the oscillator, without departing from the spirit of the present invention. If such other networks are employed, the impedances in the cross arm of the T must be of the same type and their values must be equal. Also, the impedances connected in the leg of the T and as the bridging impedance must be of the same type with respect to each other but different from the type of impedances in the cross arm of the T. The ratio of the leg and bridging impedance will always determine the relative phase angles of the output voltages and, therefore, they should be ganged so that this ratio will remain constant.

The embodiment of the invention shown in Figure 1 employs electron tubes to perform the amplifying function. However, oscillators in accordance with the invention may be devised which utilize transistors in place of vacuum tubes, in accordance with the teaching contained in my copending application, Serial No. 418,149, entitled "Oscillators," and filed on March 23, 1954. Further, the teachings of said copending application may be followed in the practice of the present invention, to provide an oscillator having a high order of freedom from harmonic distortion, low output impedance, high output power, and high amplitude stability.

While there has been described and illustrated various modifications of the present invention, it will be clear that variations thereof may be resorted to in respect to circuit details and of general arrangement without departing from the true spirit and scope of the invention as defined in the appended claims.

What I claim is:

1. A variable frequency oscillator which produces a plurality of output voltages of fixed relative phase angle, comprising a first amplifier having two input terminals and an output terminal, a second amplifier having an input terminal and an output terminal, means connecting the output terminal of said first amplifier to the input terminal of said second amplifier, a wide-band regenerative coupling connected between the output terminal of said second amplifier and a first of said two input terminals of said first amplifier, a degenerative feed-back loop connected from the output terminal of said second amplifier to the second of said two input terminals of said first amplifier, said degenerative feed-back loop containing a frequency determining bridged-T network, said bridged-T network including two cross arm impedances, each having two terminals, a bridging impedance and a leg impedance in which the impedances in the cross arm of the T are equal in value and in which the ratio of the value of the bridging impedance to the value of the impedance in the leg of the T is of a predetermined value, and leads for deriving two output voltages at said two terminals of said one of said cross arm impedances, a third amplifier having a control grid and an output circuit, and means for connecting one of said leads to said control grid.

2. The combination in accordance with claim 1, wherein is further provided a resistance connected between said other of said leads and said output circuit, a variable tap for said resistance, a further isolating amplifier having a grid input circuit and an output circuit, means for connecting said variable tap to said grid input circuit of said further isolating amplifier, and means for deriving voltage output from said output circuit of said further isolating amplifier.

3. The combination in accordance with claim 1 having means for mixing the output voltage on the other of said leads with the voltage from the output circuit of said third amplifier, a third lead and means for deriving a third voltage from said last mentioned means on said third lead.

4. The combination in accordance with claim 3 having a fourth amplifier including a control grid and an output circuit and means connecting said third lead to said control grid of said fourth amplifier.

5. The combination in accordance with claim 3 in which the ratio of the values of said two last mentioned impedances is 12 and in which the phase angle of the output voltage from said means for mixing is equal to half the phase angle of the voltage from the output circuit of said third amplifier.

6. A variable frequency oscillator which produces a plurality of output voltages of fixed relative phase angle, comprising a first amplifier having two input terminals and an output terminal, means connecting the output terminal of said first amplifier to the input terminal of said second amplifier, a wide-band regenerative coupling connected between the output terminal of said second amplifier and a first of said two input terminals of said first amplifier, a degenerative feedback loop connected from the output terminal of said second amplifier to the second of said two input terminals of said first amplifier, said degenerative feed-back loop containing a frequency determining bridged-T network, said bridge-T network including two cross arm impedances, each having two terminals, a bridging impedance and a leg impedance, the impedances in the cross arm of the T being equal in value and the ratio of the value of the bridging impedance to the value of the impedance in the leg of the T being of a predetermined value, leads for deriving two output voltages at said two terminals of one of said cross arm impedances, means for varying the frequency only of said oscillator, including means for varying the impedance values of said cross arm impedances by equal amounts, and means for varying the phase only of said output voltages, including means for varying the values of said bridging impedance and said leg impedance to vary the ratio of the values.

7. The combination in accordance with claim 6, wherein said first amplifier is a plate loaded electron tube and wherein said second amplifier is a cathode loaded electron tube.

8. A variable frequency oscillator for producing a plurality of output voltages of predetermined fixed relative phase angle comprising an amplifier having two input terminals and an output terminal, a wide-band regenerative coupling connected between said output terminal and one of said input terminals of said amplifier, a degenerative feedback loop connected between said output terminal and the other of said input terminals of said amplifier, said degenerative feedback loop containing a frequency determining bridged-T network, said bridged-T network including two cross arm impedances each having two terminals, a bridging impedance and a leg impedance, the impedances in the cross arm of the T being equal in value and the ratio of the value of the bridging impedance to the value of the impedance in the leg of the T being of predetermined value, leads for deriving two output voltages, each at one of said two terminals of one of said cross arm impedances, means for varying the frequency only of said oscillator, including means for varying the impedance values of said cross arm impedances by equal amounts, and means for varying the phase only of said output voltages, including means for varying the values of said bridging impedance and said leg impedance to vary the ratio of the values.

9. The combination in accordance with claim 8 in which the impedance in the cross arm of the T are capacitors and the two last mentioned impedances are resistors.

10. The combination in accordance with claim 8 in which one of said feed-back loops contains a circuit element having a substantial co-efficient of resistance variation with temperature.

11. The combination in accordance with claim 8, including means for varying the values of the two last mentioned impedances to change the range of the frequencies of oscillation of said oscillator, said means maintaining the ratio of said impedances at a fixed value.

12. The combination in accordance with claim 11 including means for varying the values of the two first mentioned impedances to vary the frequency of oscillation within a given range of oscillations, said means maintaining the values of the impedances equal.

References Cited in the file of this patent

UNITED STATES PATENTS

| | | |
|---|---|---|
| Re. 24,053 | Morris | Aug. 23, 1955 |
| 2,439,245 | Dunn | Apr. 6, 1948 |
| 2,586,167 | Kamm | Feb. 19, 1952 |
| 2,619,534 | Payne | Nov. 25, 1952 |
| 2,648,773 | Wallace | Aug. 11, 1953 |

OTHER REFERENCES

Article: "Variable-Frequency Bridge-Type Frequency-Stabilized Oscillators," by Shepherd and Wise; from PIRE, vol. 31, No. 6; June, 1943, pp. 256–268.